United States Patent [19]
Robert

[11] Patent Number: 5,499,647
[45] Date of Patent: Mar. 19, 1996

[54] METHOD AND VALVE ASSEMBLY FOR CONTROLLING A PILOT SIGNAL

[75] Inventor: Michael E. Robert, Farmington Hills, Mich.

[73] Assignee: MAC Valves, Inc., Wixom, Mich.

[21] Appl. No.: 371,766

[22] Filed: Jan. 12, 1995

[51] Int. Cl.$^6$ .................................... G05D 16/20
[52] U.S. Cl. ............................ 137/12; 137/85; 137/487.5
[58] Field of Search ................................ 137/12, 84, 85, 137/86, 487.5, 488, 492.5

[56] References Cited

U.S. PATENT DOCUMENTS

| | | |
|---|---|---|
| 4,244,396 | 1/1981 | Friedland et al. . |
| 4,253,480 | 3/1981 | Kessel et al. . |
| 4,481,967 | 11/1984 | Frick .............................. 137/85 |
| 4,527,583 | 7/1985 | Simpson . |
| 4,630,631 | 12/1986 | Barnes . |
| 4,635,682 | 1/1987 | Walters . |
| 4,724,865 | 2/1988 | Hirano et al. . |
| 4,877,051 | 10/1989 | Day . |
| 4,887,636 | 12/1989 | Rothen . |
| 4,898,200 | 2/1990 | Odajima et al. . |
| 4,901,758 | 2/1990 | Cook et al. . |
| 5,253,669 | 10/1993 | Gray . |
| 5,325,884 | 7/1994 | Mirel et al. . |

Primary Examiner—Robert G. Nilson
Attorney, Agent, or Firm—Bliss McGlynn

[57] ABSTRACT

A valve assembly controls a pressure sent from a valve to create a pilot signal used to control a mechanical booster regulator. An independent feedback line extends from both the output of the valve and the output of the mechanical booster regulator wherein the outputs are scaled after a transducer in each feedback line converts the information received from the pressures into voltages. The difference in the voltage is integrated and added to the input command signal which dictates the parameters of the mechanical booster regulator operation. The voltage feedback from the pilot pressure is then subtracted from the modified command signal. The feedback signals approach a negligible correction as the mechanical booster regulator approaches the designed output pressure because the integration is eliminated and the pressures cancel each other as the system approaches a static condition.

6 Claims, 2 Drawing Sheets

FIG 2
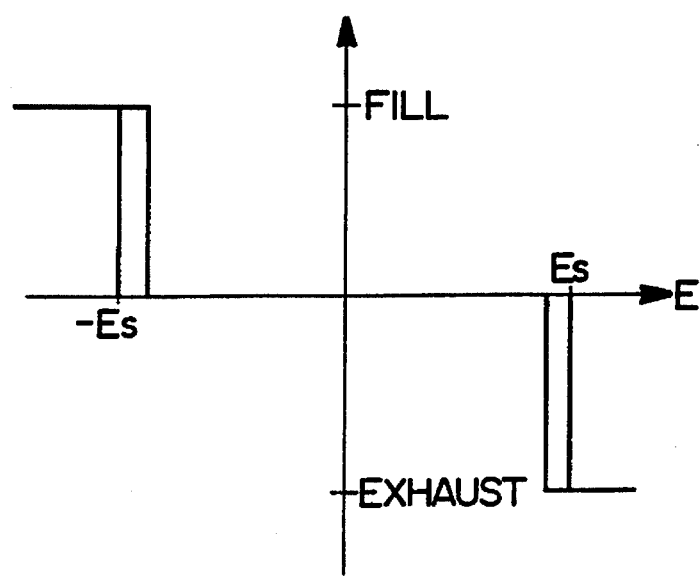
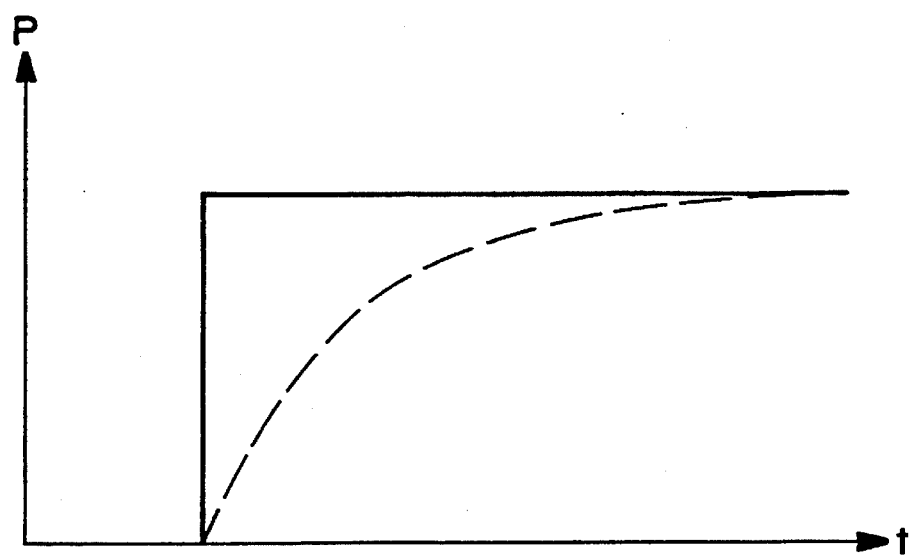
FIG 3

5,499,647

METHOD AND VALVE ASSEMBLY FOR CONTROLLING A PILOT SIGNAL

BACKGROUND OF THE INVENTION

1. Field of the Invention

The invention relates to a method and apparatus for fluid handling. More specifically, the invention relates to a method and apparatus for controlling fluid flow via pressure regulation.

2. Description of the Related Art

Electro-pneumatic control valves are commonly employed to monitor and control pressure output of mechanical booster regulators. The regulators, in turn, operate pneumatic equipment such as welding guns and paint systems. In the prior art, these control valves generally include a pair of solenoid operated popper valves which open and close in response to the signals from control circuitry to maintain a predetermined pilot pressure as dictated by command voltages selected by the operator. An electro-pneumatic transducer in a feedback loop is generally employed to control the pilot pressure output of the control valves.

Control valves known in the prior art and commercially available today are able to produce very precise pilot pressure, approximately 0.2 PSI of the command pressure. While the pilot pressure of the prior art control valves are precisely monitored, problems exist with the control of the pressure output from the mechanical regulators. Despite the precision of the control valves, the regulators can drift up to 5 psi from their target pressure. These conditions of such extreme drift are unacceptable with todays quality control standards.

To combat this problem, a second feedback loop has been employed wherein a transducer is used to monitor the output of the regulator. However, this additional feedback causes other problems. First, with this configuration, the control valve and its control circuitry must include parameters which account for the dynamics of both the solenoid operated valves and the valving of the mechanical regulator. Typically, the regulator output pressure either over or undershoots the target pressure which causes the control valve to "hunt" for its target. The solenoid operated valves thus open and close in rapid succession causing undue wear, premature failure, pressure instability and emit a noise commonly referred to as "motorboating." A description of a variation of a feedback system is found in applicant's co-pending application Ser. No. 08/371,769, filed Jan. 12, 1995.

Additional feedback lines and additional transducers are expensive and can impermissibly raise the cost of the control valves with limited success in reducing the underdampening efforts.

SUMMARY OF THE INVENTION

A pilot control assembly controls an output pressure of a booster regulator used to regulate the pressure of a fluid supply at an output port. The output pressure is based on the command signal. The pilot control assembly comprises a valve defining a valve output port in fluid communication with the booster regulator. The valve receives fluid from the fluid supply to produce a pilot signal to control the booster regulator. The valve further includes an electrical port. A pilot pressure feedback loop is in fluid communication with the valve output port and is also electrically connected to the electrical port. The pilot pressure feedback loop creates a pilot pressure feedback signal based on the pilot signal. An output pressure feedback loop is in fluid communication with the output port of the booster regulator and is electrically connected to the electrical port. The output pressure feedback loop creates an output pressure feedback signal based on the output pressure of the booster regulator. The pilot signal control assembly is characterized by the output pressure feedback loop including an integration circuit for integrating the difference between the pilot pressure feedback signal and the output pressure feedback signal to create an integrated feedback signal.

The advantages associated with the invention includes controlling a valve to prematurely slow the increase of the output pressure created by the booster regulator preventing the valve from overshooting its target to the point of creating an underdampened system preventing instability which creates the "motorboating" phenomenon.

BRIEF DESCRIPTION OF THE DRAWINGS

Other features and advantages of the present invention will be readily appreciated as the same becomes better understood after reading the subsequent description when considered in connection with the accompanying drawings, wherein:

FIG. 2 is a graphic representation of the pilot pressure signal as a function of the error signal; and FIG. 3 is a graphic representation of the output pressure of the booster regulator.

DETAILED DESCRIPTION OF THE DRAWINGS

Figure 1:
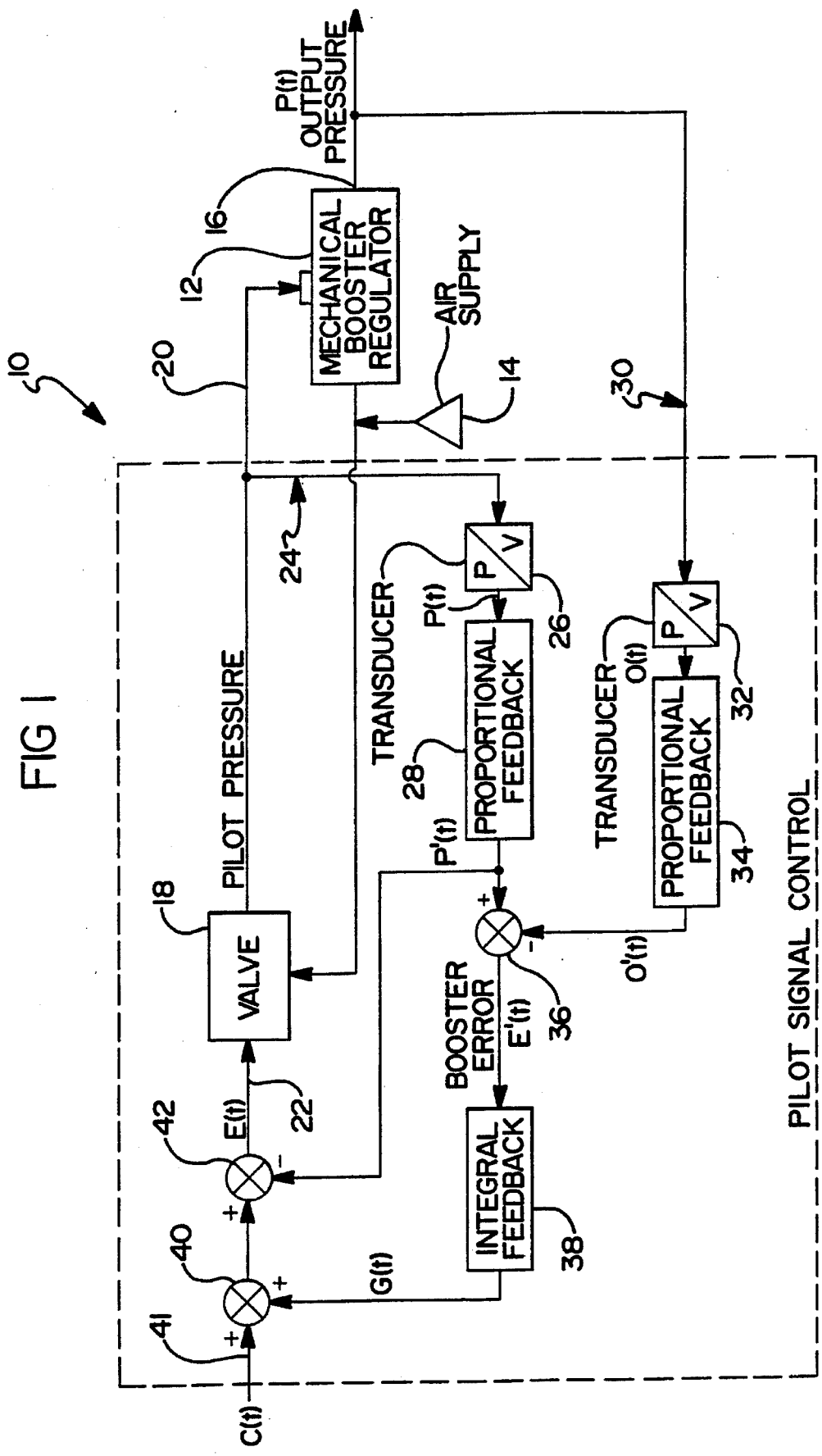
FIG. 1 is a block diagram of the preferred embodiment of the subject invention.

Turning to FIG. 1, a pilot signal control assembly is generally indicated at 10. The pilot signal control assembly 10 controls an output pressure P(t) of a booster regulator 12 which is used to regulate the pressure of a fluid supply 14 at an output port 16.

The pilot signal control assembly 10 comprises a valve 18 in fluid communication with the fluid supply 14 and the booster regulator 12. Although the valve 18 may be any valve suitable for use with the pilot signal control assembly 10, the preferred embodiment of the valve 18 is a poppet valve similar to the popper valve disclosed in U.S. Pat. No. 5,092,365, issued to Neff on Mar. 3, 1992 and assigned to the assignee of the subject invention. This patent is hereby expressly incorporated by reference.

The valve 18 receives fluid from the fluid supply 14, an air supply in the preferred embodiment, to produce a pilot pressure through a pilot pressure line 20. The pilot pressure is a signal and is used to control the booster regulator 12. The valve 18 further includes an electrical port 22 used to receive an error signal E(t), discussed in greater detail below.

A pilot pressure feedback loop, generally shown at 24, is in fluid communication with the pilot pressure line 20 and electrically connected to the electrical port 22 of the valve 18. The pilot pressure feedback loop 24 includes a transducer 26 which is in direct fluid communication with the pilot pressure line 20. The transducer 26 is a pressure voltage transducer and transforms energy received from the pilot pressure line 20 in the form of fluid pressure into a voltage signal P(t) which will subsequently be used to define the error signal E(t), discussed in greater detail below. The pilot pressure feedback loop 24 includes a proportional feedback circuit 28 which modifies the voltage signal P(t) according to the following equation:

$$P'(t)=AP(t) \tag{1}$$

wherein the proportional factor A is a factor representing the calibration of the booster regulator 12. The proportional factor A will change dependant upon the calibration size of the booster regulator 12 to which the pilot signal control assembly 10 is attached.

The pilot signal control assembly 10 further includes an output pressure feedback loop, generally shown at 30, fluidly communicating with the output port 16 of the booster regulator 12 and is electrically connected to the electrical port 22 of the valve 18. The output pressure feedback loop 30 creates an output pressure feedback signal based on the output pressure of the booster regulator 12. Similar to the pilot pressure feedback loop 24, the output pressure feedback loop includes a transducer 32 which is a pressure voltage transducer and transforms energy received from the output port 16 in the form of fluid pressure into a voltage signal O(t) which will subsequently be used to create the error signal E(t).

Once the output voltage signal O(t) is created by the transducer 32, a second proportional feedback circuit 34 modifies the output signal O(t) according to the following equation:

$$O'(t)=BO(t) \tag{2}$$

wherein the proportional factor B is a factor representing the calibration of the booster regulator 12. The proportional factor B will change dependent upon the calibration of the booster regulator 12 to which the pilot signal control assembly 10 is attached.

Once the pilot pressure feedback signal and the output pressure feedback signals are created, a subtraction circuit 36 subtracts the output pressure feedback signal from the pilot pressure feedback signal to create a difference signal according to the following equation:

$$E'(t)=P'(t)-O'(t). \tag{3}$$

The pilot signal control assembly 10 is characterized by the output pressure feedback loop 30 including an integration circuit 38 for integrating the difference between the pilot pressure feedback signal and the output pressure feedback signal to create an integrated feedback signal. More specifically, the integration circuit 38 receives the signal from the subtraction circuit 36 and integrates the output thereof to create an integrated signal from the subtraction signal. Therefore, the integration circuit 38 modifies the output of the subtraction circuit 36 pursuant to the following equation:

$$G(t)=\int (P'(t)-O'(t))dt \tag{4}$$

An adding circuit 40 adds the integrated signal G(t) to the command signal C(t) received from an input line 41. The command signal C(t) is created by an external control unit (not a part of the subject invention) which dictates when the booster regulator 12 will have an output pressure.

An electrical port subtraction circuit 42 receives the modified command signal and subtracts from it the pilot pressure feedback signal P'(t) to create the error signal E(t) pursuant to the following equation:

$$E(t)=[C(t)=\int(P'(t))dt-P'(t)]. \tag{5}$$

As the valve 18 and booster regulator 12 approach a static condition, i.e., when the booster regulator 12 reaches or approaches the desired output pressure, the integration is eliminated and the equation becomes:

$$E(t)=C(t)+P'(t)-O'(t)-P'(t). \tag{6}$$

Therefore, in the static condition, the pilot pressure feedback signal cancels itself and the error signal becomes $$E(t)=C(t)-O'(t) \tag{7}$$

which can be rewritten as $$O'(t)=C(t)-E(t). \tag{8}$$

Hence, the output pressure O'(t) becomes the command signal minus the error signal. When the error approaches 0, the output pressure equals the command signal.

Using the assembly 10 as described above, the operation of controlling the output pressure of the booster regulator 12 includes the steps of: opening the valve 18 to create a pilot pressure; opening the booster regulator 12 based on the fluid received from the valve 18 to create an output flow defining an output pressure P(t); transforming energy from the output pressure into an output pressure voltage signal O(t); transforming energy from the pilot pressure into a pilot pressure voltage signal; subtracting the output pressure voltage signal from the pilot pressure voltage signal to create a difference signal; integrating the different signal to create an integrated signal; and adding the integrated signal to a command signal. The method further includes the step of subtracting the pilot pressure voltage signal from the command signal to create the error signal. Once the error signal has been created it is sent to and controls the valve 18.

Turning to FIG. 2, a graph is shown to represent the action or state of the valve 18 as a function of the value of the error signal. More specifically, the Y-axis represents the command for the valve 18 to fill or exhaust the pilot pressure line 20. Therefore, if the error signal produces a negative signal larger than the threshold $-E_s$, the valve 18 will increase the pressure in the pilot pressure line 20. If, however, the error signal is greater than a positive threshold $E_s$, the valve 18 will exhaust or reduce the pressure in the pilot pressure line 20. In between the threshold values $-E_s$, $E_s$, the valve 18 will maintain the pressure in the pilot pressure line 20. The hysteresis shown in FIG. 2 is built into the valve 18 so that the valve 18 does not immediately respond to the change in pressure due to the filling or exhausting of the valve 18. This hysteresis also increases the life of the valve 18 because it is not rapidly switching states unnecessarily. Although the threshold values $-E_s$, $E_s$, are shown to be equal and opposite, any value from either of the thresholds may be suitable depending on the environment in which the booster regulator 12 is used.

Turning to FIG. 3, the command signal is represented by a solid line which corresponds to a step function. The actual pilot pressure is shown in a dashed line. The valve 18 responds to the error signal E(t) based on the modified command pressure signal and reduces the pressure of the pilot signal to the booster regulator 12 and immediately begins to reduce the output of the booster regulator 12. As the output of the booster regulator 12 approaches the desired output pressure, the system approaches a static condition and the effect of the pilot pressure feedback signal as on the command signal is eliminated and the output pressure corresponds to the command signal minus the error signal. When the error signal approaches 0, the output pressure equals the command signal.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

I claim:

1. A pilot signal control assembly for controlling an output pressure of a booster regulator used to regulate the pressure of a fluid supply at an output port based on a command signal, said pilot signal control assembly comprising:

a valve defining a valve output port in fluid communication with the booster regulator, said valve receiving fluid from the fluid supply to produce a pilot signal to control the booster regulator, said valve further including an electrical port;

a pilot pressure feedback loop fluidly communicating with said valve output port and electrically connected to said electrical port, said pilot pressure feedback loop creating a pilot pressure feedback signal based on said pilot signal;

an output pressure feedback loop fluidly communicating with the output port of the booster regulator and electrically connected to said electrical port, said output pressure feedback loop creating an output pressure feedback signal based on the output pressure of the booster regulator; and said output pressure feedback loop including an integration circuit for integrating the difference between said pilot pressure feedback loop signal and said output pressure feedback signal to create an integrated feedback signal.

2. An assembly as set forth in claim 1 further characterized by an adding circuit for adding the command signal and said integrated feedback signal to create a modified command signal.

3. An assembly as set forth in claim 2 further characterized by an electrical port subtraction circuit for subtracting said pilot pressure feedback signal from said modified command signal.

4. A method for controlling an output pressure of a booster regulator by a valve having a pilot pressure feedback loop and an output pressure feedback loop, the method comprising the steps of:

opening the valve to create a pilot pressure;

opening the booster regulator based on the fluid received from the valve to create an output flow defining an output pressure;

transforming energy from the output pressure into an output pressure voltage signal;

transforming energy from the pilot pressure into a pilot pressure voltage signal;

subtracting the output pressure voltage signal from the pilot pressure voltage signal to create a difference signal;

integrating the difference signal to create an integrated signal; and adding the integrated signal to a command signal.

5. A method as set forth in claim 4 further characterized by subtracting the pilot pressure voltage signal from the command signal to create an error signal.

6. A method as set forth in claim 5 further characterized by sending the error signal to the valve to control the valve.

* * * * *